(12) United States Patent
Li (10) Patent No.: US 12,192,787 B2
(45) Date of Patent: Jan. 7, 2025

(54) METHOD AND APPARATUS FOR TRANSMITTING DATA, SYSTEM AND STORAGE MEDIUM

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 324 days.

(21) Appl. No.: 17/620,778

(22) PCT Filed: Jun. 25, 2019

(86) PCT No.: PCT/CN2019/092836
§ 371 (c)(1),
(2) Date: Dec. 20, 2021

(87) PCT Pub. No.: WO2020/258041
PCT Pub. Date: Dec. 30, 2020

(65) Prior Publication Data
US 2022/0369124 A1    Nov. 17, 2022

(51) Int. Cl.
*H04W 16/28* (2009.01)
*H04B 7/06* (2006.01)
*H04W 76/20* (2018.01)
*H04W 80/02* (2009.01)

(52) U.S. Cl.
CPC .......... *H04W 16/28* (2013.01); *H04B 7/0695* (2013.01); *H04W 76/20* (2018.02); *H04W 80/02* (2013.01)

(58) Field of Classification Search
None
See application file for complete search history.

(56) References Cited

U.S. PATENT DOCUMENTS

| | | | |
|---|---|---|---|
| 2014/0370823 A1* | 12/2014 | Yu | H04B 1/401 455/73 |
| 2018/0048375 A1* | 2/2018 | Guo | H04B 7/024 |
| 2018/0219606 A1* | 8/2018 | Ng | H04L 25/0204 |
| 2019/0199496 A1* | 6/2019 | Qin | H04B 7/0617 |
| 2019/0297603 A1* | 9/2019 | Guo | H04L 5/0053 |

(Continued)

FOREIGN PATENT DOCUMENTS

| | | |
|---|---|---|
| CN | 106603128 A | 4/2017 |
| EP | 3364576 A1 | 5/2019 |
| WO | WO 2018171426 A1 | 9/2018 |

OTHER PUBLICATIONS

Indian Patent Application No. 202247002887, Office Action dated Apr. 25, 2022, 6 pages.

(Continued)

*Primary Examiner* — Kenny S Lin
(74) *Attorney, Agent, or Firm* — COZEN O'CONNOR (57) ABSTRACT

A method for transmitting data using beams, performed by a network device, includes determining an indication signaling for indicating a data stream combination, the data stream combination including a plurality of data streams, the plurality of data streams being grouped into at least two data stream groups, one or more data streams in each of the at least two data stream groups being corresponding to a beam direction; and transmitting the indication signaling.

8 Claims, 4 Drawing Sheets

(56) References Cited

U.S. PATENT DOCUMENTS

| | | | | |
|---|---|---|---|---|
| 2019/0373450 | A1* | 12/2019 | Zhou | H04L 5/001 |
| 2020/0014444 | A1* | 1/2020 | Mueck | H04B 7/0408 |
| 2020/0053767 | A1* | 2/2020 | Bai | H04W 72/23 |
| 2020/0154409 | A1* | 5/2020 | Kang | H04W 72/04 |
| 2020/0288479 | A1* | 9/2020 | Xi | H04L 5/0051 |
| 2020/0359404 | A1* | 11/2020 | Nilsson | H04B 7/088 |
| 2021/0100033 | A1* | 4/2021 | Li | H04L 27/0006 |
| 2021/0168030 | A1* | 6/2021 | Li | H04W 72/23 |
| 2022/0026517 | A1* | 1/2022 | Hasegawa | G01S 13/765 |

OTHER PUBLICATIONS

European Patent Application No. 19935238.6, extended Search and Opinion dated Jun. 7, 2022, 9 pages.

Huawei, et al. "Further details on beam indication" 3GPPTSGRAN 明 TGl Meeting #91, RI-1719806; Nov. 2017; 12 pages.

Japanese Patent Application No. 2021-576759, Office Action dated Nov. 15, 2022, 3 pages.

Japanese Patent Application No. 2021-576759, English translation of Office Action dated Nov. 15, 2022, 4 pages.

NTT Docomo, Inc. "Enhancements on multi-TRP/panel transmission" 3GPP TSG RAN WG1 Meeting #95, R1-1813333, Nov. 2018, 21 pages.

Huawei, HiSilicon "Enhancements on Multi-TRP/panel transmission" 3GPP TSG RAN WG1 Meeting #96, R1-1901567, Feb. 2019, 15 pages.

Huawei, HiSilicon "Single PDCCH based multi-TRP/panel transmission" 3GPP TSG RAN WG1 Ad-Hoc Meeting 1901, R1900848, Jan. 2019, 7 pages.

Apple "Considerations on PDCCH design for NCJT" 3GPP TSG RAN WG1 Meeting #94bis, R1-1811124, Oct. 2018, 7 pages.

PCT/CN2019/092836 International Search Report dated Feb. 6, 2020, 2 pages.

Korean Patent Application No. 10-2022-7001158, Office Action dated Apr. 5, 2023, 5 pages.

Korean Patent Application No. 10-2022-7001158, English translation of Office Action dated Apr. 5, 2023, 5 pages.

Ericsson "On multi-TRP and multi-panel" 3GPP TSG RAN WG1 Meeting RAN1#96-bis, R1-1904750, Apr. 2019, 18 pages.

Huawei et al. "Summary of AI: 7.2.8.2 Enhancements on Multi-TRP/Panel Transmission of Offline Discussion" 3GPP TSG RAN WG1 Meeting #97, R1-1907706, May 2019, 66 pages.

NTT Docomo, Inc. "Enhancements on multi-TRPpanel transmission" 3GPP TSG RAN WG1 #97, R1-1906224, May 2019, 32 pages.

Japanese Patent Application No. 2021-576759, Office Action dated Apr. 18, 2023, 3 pages.

Japanese Patent Application No. 2021-576759, English translation of Office Action dated Apr. 18, 2023, 3 pages.

NTT Docomo Inc. "Discussion on multi-beam enhancement" 3GPP TSG RAN WG1 Meeting #94bis, R1-1811349, Oct. 2018, 12 pages.

* cited by examiner

METHOD AND APPARATUS FOR TRANSMITTING DATA, SYSTEM AND STORAGE MEDIUM

CROSS-REFERENCE TO RELATED APPLICATION

This application is a national phase of International Application No. PCT/CN2019/092836, filed on Jun. 25, 2019, the entire content of which is incorporated herein by reference.

TECHNICAL FIELD

The disclosure relates to the field of communication technologies, and more particularly, to a method and an apparatus for transmitting data, a system and a storage medium.

BACKGROUND

Data transmission in new radio (NR) technologies is generally performed based on beams, for example, beamforming and beam steering, to ensure coverage and resist path loss.

When transmitting data using beams, a network device (such as a base station) indicates a transmission configuration indication (TCI) state or spatial relation information (spatialrelationinfo) through a signaling to indicate a receiving beam and a transmitting beam for a terminal. Each TCI state or each piece of spatial relation information corresponds to a reference signal (RS) identifier. The RS can be either a non-zero channel state information reference signal (CSI-RS), a synchronization signal block (SSB), or a sounding reference signal (SRS). In this way, the TCI state or spatial relation information can be used to inform the terminal to receive a physical downlink control channel (PDCCH) or a physical downlink shared channel (PDSCH) using the same receiving beam that is used to receive which SSB or CSI-RS from the base station or using a receiving beam corresponding to a transmitting beam that is used to transmit which SRS. Alternatively, the TCI state or spatial relation information can be used to inform the terminal to transmit a physical uplink control channel (PUCCH) or a physical uplink shared channel (PUSCH) using the same transmitting beam that is used to transmit which SRS or using a transmitting beam corresponding to a receiving beam that is used to receive which SSB or CSI-RS.

Multiple-input multiple-output (MIMO) in the future may support data transmission based on multiple transmission reception points (TRPs) or multiple antenna panels. That is, data are transmitted and received in multiple beam directions simultaneously. Each TRP or panel supports the transmission of multiple data streams. There are different combinations of multiple data streams.

However, when data are transmitted and received in multiple beam directions simultaneously, if the terminal does not correctly obtain the receiving beam or transmitting beam corresponding to each data stream indicated by the base station, data reception at the terminal or base station may fail, resulting in the reduced throughput.

SUMMARY

The disclosure provides a method and an apparatus for transmitting data, a system and a storage medium.

According to a first aspect of embodiments of the disclosure, a method for transmitting data, for a network device, is provided. The method includes: determining an indication signaling for indicating a data stream combination, in which the data stream combination includes a plurality of data streams, the plurality of data streams are grouped into at least two data stream groups, and one or more data streams in each of the at least two data stream groups correspond to a beam direction; and transmitting the indication signaling.

According to a second aspect of embodiments of the disclosure, a method for transmitting data, for a terminal, is provided. The method includes: receiving an indication signaling for indicating a data stream combination, in which the data stream combination includes a plurality of data streams, the plurality of data streams are grouped into at least two data stream groups, and one or more data streams in each of the at least two data stream groups correspond to a beam direction; and determining a beam for transmitting each data stream in the data stream combination indicated by the indication signaling based on the data stream combination and transmitting the data stream in the data stream combination using the beam.

According to a third aspect of embodiments of the disclosure, a communication system is provided. The communication system includes: the apparatus for transmitting data for the network device according to the third aspect or any embodiment of the third aspect and the apparatus for transmitting data for the terminal according to the fourth aspect or any embodiment of the fourth aspect.

According to a fourth aspect of embodiments of the disclosure, a device for transmitting data, for a network device, is provided. The device includes: a processor and a memory configured to store instructions executable by the processor. The processor is configured to execute the method for transmitting data according to the first aspect or any embodiment of the first aspect.

According to a fifth aspect of embodiments of the disclosure, a non-transitory computer-readable storage medium having instructions stored thereon is provided. When the instructions in the storage medium are executed by a processor of a network device, the network device is caused to execute the method for transmitting data according to the first aspect or any embodiment of the first aspect.

According to a sixth aspect of embodiments of the disclosure, a device for transmitting data, for a terminal, is provided. The device includes: a processor and a memory configured to store instructions executable by the processor. The processor is configured to execute the method for transmitting data according to the second aspect or any embodiment of the second aspect.

According to a seventh aspect of embodiments of the disclosure, a non-transitory computer-readable storage medium having instructions stored thereon is provided. When the instructions in the storage medium are executed by a processor of a terminal, the terminal is caused to execute the method for transmitting data according to the second aspect or any embodiment of the second aspect.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1:
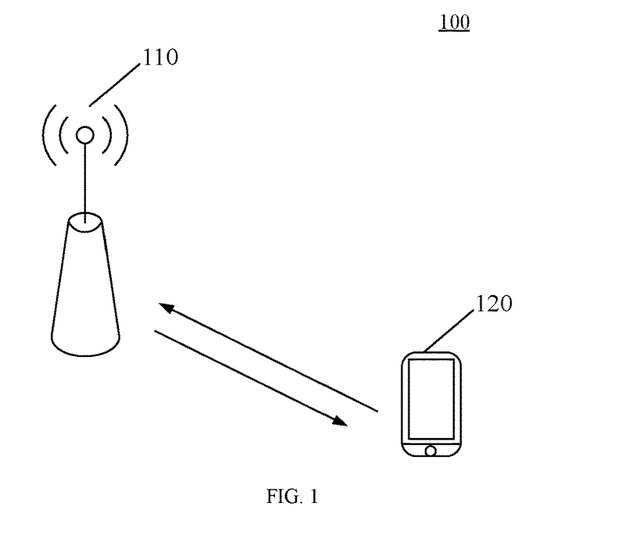
FIG. 1 is a schematic diagram of a wireless communication system according to some exemplary embodiments.

The method for transmitting data, provided in embodiments of the disclosure, can be applicable to the wireless communication system 100 as illustrated in FIG. 1. As illustrated in FIG. 1, the wireless communication system 100 includes a network device 110 and a terminal 120. The terminal 120 is coupled to and performs data transmission with the network device 110 through wireless resources.

It can be understood that the wireless communication system 100 as illustrated in FIG. 1 is for schematic illustration only. The wireless communication system 100 may also include other network devices, such as core network devices, wireless relay devices and wireless backhaul devices, which are not illustrated in FIG. 1. The embodiments of the disclosure do not limit the number of network devices and the number of terminals included in the wireless communication system.

It can be further understood that the wireless communication system in embodiments of the disclosure is a network that provides wireless communication functions. The wireless communication systems can use different communication technologies, such as code division multiple access (CDMA), wideband code division multiple access (WCDMA), time division multiple access (TDMA), frequency division multiple access (FDMA), orthogonal frequency-division multiple access (OFDMA), single carrier FDMA (SC-FDMA), carrier sense multiple access with collision avoidance. Based on different network capacities, speeds, delays and other factors, networks can be grouped into 2G (second-generation wireless telephone technology) networks, 3G (third-generation wireless telephone technology) networks, 4G (fourth-generation wireless telephone technology) networks or future evolution networks such as 5G (fifth-generation wireless telephone technology) networks. A 5G network can also be referred to as a New Radio (NR) network. For the convenience of description, the wireless communication network is sometimes referred to simply as a network in the disclosure.

Further, the network device 110 involved in the disclosure may also be referred to as a wireless access network device. The wireless access network device may be, for example, a base station, an evolved node B, a home base station, an access point (AP) of a wireless fidelity (WIFI) system, a wireless relay node, a wireless backhaul node, a transmission point (TP) or a transmission and reception point (TRP). The wireless access network device may be a gNB in the NR system or can also be a component or part of the device constituting the base station. It should be understood that, in embodiments of the disclosure, the specific technology and specific device form adopted by the network device are not limited. In the disclosure, the network device can provide communication coverage for a specific geographic area and can communicate with terminals located in the coverage area (cell). In addition, when the communication system is a vehicle-to-vehicle (V2X) communication system, the network device may also be a vehicle-mounted device.

Further, the terminal 120 involved in the disclosure may also be referred to as a terminal device, a user equipment (UE), a mobile station (MS) or a mobile terminal (MT), which is a kind of devices through which voice and/or data connectivity may be provided to a user. For example, the terminal may be a handheld device or a vehicle-mounted device having a wireless connection function. Currently, the terminal may be a mobile phone, a pocket personal computer (PPC), a handheld computer, a personal digital assistant (PDA), a notebook computer, a tablet computer, a wearable device or a vehicle device. In addition, when the communication system is a V2X communication system, the network device may also be a vehicle-mounted device. It should be understood that embodiments of the disclosure do not limit the specific technology and specific device form adopted by the terminal.

In the disclosure, data transmission is performed between the network device 110 and the terminal 120 based on beams. In the process of beam-based data transmission, the network device 110 uses multiple TRPs/panels to transmit data simultaneously and each TRP/panel transmits data using one transmitting beam direction. Accordingly, the terminal 120 needs to use multiple panels to receive data simultaneously and each panel uses one receiving beam to receive data. For the process of beam-based receiving, the TCI state or spatial relation information is configured to inform the terminal 120 that when the PDCCH/PDSCH is received, it is determined to use the same receiving beam used when receiving which SSB or CSI-RS from the network device 110 or use the receiving beam corresponding to the same transmitting beam used when transmitting which SRS.

In the related art, the network device 110 indicates the TCI state or spatial relation information through a DCI signaling. The TCI state or spatial relation information can be used as beam indication information to indicate the beam direction. In the disclosure, the beam direction includes an uplink beam direction and a downlink beam direction. When the data stream is a downlink data stream, the beam direction corresponds to the downlink receiving beam direction, which is configured to represent the downlink receiving beam corresponding to each data stream. When the data stream is an uplink data stream, the beam direction corresponds to the uplink beam direction, which is configured to represent the uplink transmitting beam corresponding to the data stream.

Taking the PDSCH as an example, if two data streams are transmitted on the PDSCH, different data streams transmit different transport blocks (TBs). If different TBs are transmitted by the same panel of the same TRP, the TCI states corresponding to the two data streams are consistent. Taking the two TBs as TB1 and TB2 as an example, the corresponding DCI signalings can be as follows.

For transport block 1:
   Modulation and coding scheme—5 bits as defined in Subclause x.x of [6, TS 38.214]
   New data indicator—1 bit
   Redundancy version—2 bits as defined in Table 7.3.1.1.1-2
For transport block 2 (only present if Number-MCS-HARQ-DL-DCI equals 2):
   Modulation and coding scheme—5 bits as defined in Subclause x.x of [6, TS 38.214]
   New data indicator—1 bit
   Redundancy version—2 bits as defined in Table 7.3.1.1.1-2
Transmission configuration indication—0 bit if higher layer parameter tci-PresentInDCI is not enabled; otherwise 3 bits as defined in Subclause x.x of [6, TS38.214].

It can be seen from the above DCI signalings that although TB1 and TB2 are transmitted by different data streams, the corresponding TCI states of TB1 and TB2 are the same, that is, the network device 110 informs the terminal 120 to use the same receiving beam to receive the TBs of the two data streams.

The TCI state is illustrated in Table 1 below. The terminal 120 can determine the receiving beam based on the TCI state.

TABLE 1

| TCI state | RS index | comment |
| --- | --- | --- |
| TCI#0 | SSB index#1 | If the network device instructs the terminal to use TCI#0, the terminal is instructed to use the receiving beam when receiving SSB index#1 to receive the PDSCH. The base station may implicitly mean that the base station uses the transmitting beam when transmitting SSB index#1 to transmit the PDSCH at this time to the terminal, so it is best for the terminal to use the same receiving beam to receive. |
| TCI#1 | SSB index#2 | |
| TCI#2 | CSI-RS index#5 | |
| TCI#3 | CSI-RS index#6 | |
| ... | | |

In the related art, codepoint is used to indicate TCI state or spatial relation information. One TCI codepoint or spatial relation information codepoint can indicate at most two TCI states or two pieces of spatial relation information, that is, beam directions of two TRPs/antenna panels.

Generally, one DCI indication can indicate at most multiple data streams from two TRPs/panels, for example, it can indicate at most 4 data streams from two TRPs or panels. The maximum 4 data streams can have different combinations. Each combination can belong to any TRP/panel of the two TRPs/panels. Therefore, the terminal may not determine which TRP/panel each data stream combination comes from, which causes failure of the data stream reception, so that the data reception success rate is low, and the throughput is low. For example, combinations of up to 4 data streams indicated by the DCI indication may be "1 data stream+1 data stream", "1 data stream+2 data streams", "2 data streams+1 data stream", "2 data streams+2 data streams", "1 data stream+3 data streams" and "3 data streams+1 data stream".

For the above combinations, if the network device 110 has no additional signaling instruction, the combination of "1 data stream+1 data stream" between the network device 110 and the terminal 120 has no ambiguity, that is, when two data streams are indicated, each data stream corresponds to one TRP/panel. If "1 data stream+3 data streams" and "3 data streams+1 data stream" are not supported, the configuration of "2 data streams+2 data streams" is not ambiguous, too, that is, when 4 data streams are indicated, every 2 data streams correspond to one TRP/panel.

Ambiguous combinations are provided as follows. When three data streams are indicated, it is difficult to determine which combination is indicated, the combination of "1 data stream+2 data streams", i.e., the first data stream corresponds to the first TRP/panel and the last two data streams correspond to the second TRP/panel, or the combination of "2 data streams+1 data stream", i.e., the first two data streams correspond to the first TRP/panel and the last data stream corresponds to the second TRP/panel. In addition, if "1 data stream+3 data streams" and "3 data streams+1 data stream" are also supported, when 4 data streams are indicated, there may be 3 types of ambiguity combinations: "1 data stream+3 data streams", "3 data streams+1 data stream" and "2 data streams+2 data streams". If the terminal 120 cannot accurately know which combination it is, it may not obtain correct reception configuration information such as the TCI state for some data streams and wrong TCI state used may lead to data reception failure and the reduced throughput.

Similarly, for PUSCH transmission, when the terminal needs to transmit a plurality of data streams to the network device, which transmitting beam to use for each data stream may also be clearly indicated to the terminal by the network device. Otherwise, if the network device instructs the terminal to transmit the second data stream in the first beam direction and the terminal transmits the second data stream in the second beam direction actually, the network device receives the second data stream in the beam direction corresponding to the first beam direction, so that the inconsistency of the terminal and the network device will cause failure of receiving by the network device, to reduce the throughput. The network device instructs the transmitting beam to the terminal based on the TCI state or spatial relation information.

In view of this, in the case that different TBs are transmitted by different TRPs/panels in the data transmission based on multiple TRPs/panels, in order to enable the terminal to accurately learn the TCI state or spatial relation information and accurately determine the beam direction corresponding to each data stream in the data stream combination to use the beam corresponding to the determined beam direction to transmit the data stream, the disclosure provides a method for transmitting data. In the method for transmitting data, based on the indication signaling for indicating the data stream combination, the terminal is enabled to determine the beam for transmitting each data stream in the data stream combination based on the data stream combination indicated by the indication signaling and use the determined beam to transmit each data stream in the data stream combination.

It is understandable that the data streams in the data stream combination involved in the disclosure all are data streams in the data stream combination to be transmitted by the terminal or all are data streams in the data stream combination to be received by the terminal. The beams of all data streams in the data stream combination may all be the receiving beams of the terminal, or all be the transmitting beams of the terminal.

In the disclosure, the terminal can accurately determine the receiving beam of each data stream in the data stream combination to be received by the terminal based on the indication signaling for indicating the data stream combination and use the receiving beam to receive each data stream in the data stream combination. Or the terminal can accurately determine the transmitting beam of each data stream in the data stream combination to be transmitted by the terminal based on the indication signaling for indicating the data stream combination and use the transmitting beam to transmit each data stream in the data stream combination. Therefore, the success reception rate of data and the throughput may be improved.

Figure 2:
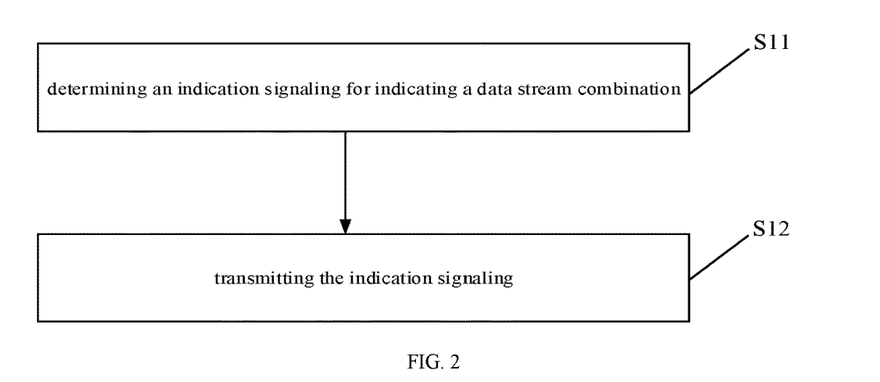
FIG. 2 is a flowchart of a method for transmitting data according to an exemplary embodiment.

FIG. 2 is a flowchart of a method for transmitting data according to an exemplary embodiment. As illustrated in FIG. 1, the method for transmitting data is applicable to the network device. The method includes the following.

In S11, an indication signaling is determined.

In the disclosure, the determined indication signaling is configured to indicate the data stream combination. The data stream combination includes a plurality of data streams. The plurality of data streams is grouped into at least two data stream groups. One or more data streams in each of the at least two data stream groups correspond to a beam direction. For example, if the data stream combination is "1 data stream+3 data streams", the data stream combination includes 4 data streams. The 4 data streams are grouped into two groups, namely "1 data stream and 3 data streams", in which 1 data stream corresponds to one beam direction (from the same TRP/panel) and 3 data streams correspond to one beam direction (from the same TRP/panel).

It should be noted that all data streams scheduled by one DCI signaling may be all downlink data streams and each data stream combination corresponds to the receiving beam direction of the terminal. All data streams scheduled by one DCI signaling may also be all uplink data streams and each data combination corresponds to the transmitting beam direction of the terminal.

In S12, the indication signaling is transmitted.

In the disclosure, the network device transmits the indication signaling. The terminal after receiving the indication signaling can determine the beam direction corresponding to each data stream combination in the data stream combination based on the data stream combination indicated by the indication signaling. The terminal can determine the receiving beam of each data stream combination in the data stream combination and use the receiving beam to receive each data stream in the data stream combination to improve the data reception success rate or determine the transmitting beam of each data stream combination in the data stream combination and use the transmitting beam to transmit each data stream in the data stream combination to improve the throughput.

Some embodiments in which the network device transmits the indication signaling will be described below.

In some embodiments, the indication signaling is transmitted through the DCI.

The indication signaling in the disclosure may be the DCI signaling. The value(s) of the bit(s) included in the DCI signaling indicate the data stream combination and different values of the bit(s) are configured to indicate different data stream combinations. If the terminal can determine all the data stream combinations and save the corresponding relationship between the value(s) of the bit(s) and the data stream combinations, the data stream combination is determined after obtaining the value(s) of the bit(s) transmitted through the DCI.

All data stream combinations supported by the terminal can be notified by the network device through the RRC signaling or all supported data stream combinations can be stored on the terminal and network device in a pre-defined manner by the system.

In some embodiments, two different data stream combinations can be indicated by different values of 1 bit. For example, the maximum number of supported data streams is 4 and the two data stream combinations "1 data stream+3 data streams" and "3 data streams+1 data stream" are not included in all supported data stream combinations. The disclosure can indicate the combination when there are 3 data streams, i.e., "1 data stream+2 data streams" or "2 data streams+1 data stream", that is, indicate by 1 bit, different values of the bit correspond to different data stream combinations. For example, when the value of the bit is "0", it means the combination of "2 data streams+1 data stream", and when the value of the bit is "1", it means the combination of "1 data stream+2 data streams". Certainly, the disclosure does not limit the correspondence between the values of the bit and the combinations. For example, when the value of the bit is "1", it means the combination of "2 data streams+1 data stream", and when the value of the bit is "0", it means the combination of "1 data stream+2 data streams".

For the convenience of description in the disclosure, the DCI for indicating the data stream combination by 1 bit is referred to as the first DCI and 1 bit is referred to as the first bit. The first DCI includes the first bit. The number of bits of the first bit is 1. Different values of the first bit are configured to indicate different data stream combinations.

In the disclosure, the first bit may be a bit separately configured to indicate the data stream combination in the first DCI or may be a bit with a reserved bit value in the first DCI. The reserved bit value indicates the data stream combination and the occupied bit value may indicate other information different from the data stream combination, for example, antenna port information.

In the disclosure, the network device transmits the indication signaling through the first DCI, so that the terminal after receiving the first DCI can determine the data stream combination through the bit value and further determine the beam direction.

In the disclosure, different values of the bits can be configured to indicate different data stream combinations. For example, the maximum number of supported data streams is 4 and all the supported data stream combinations include "1 data stream+2 data streams", "2 data streams+1 data stream", "2 data streams+2 data streams", "1 data stream+3 data streams" and "3 data streams+1 data stream". Except for the need to indicate the data stream combination is "1 data stream+2 data streams" or "2 data streams+1 data stream" when the number of data streams is 3, it is also necessary to indicate the data stream combination when the number of data streams is 4 from one of "2 data streams+2 data streams", "1 data stream+3 data streams" and "3 data streams+1 data stream". In the disclosure, different values of at least 2 bits can be configured to indicate the data stream combination containing the maximum of 4 data streams.

On the one hand, in the disclosure, when the number of supported data streams is at most 3, different values of one of the plurality of bits can be configured to indicate different data stream combinations. For example, in the disclosure, "1 data stream+2 data streams" and "2 data streams+1 data stream" can be indicated by different values of the lower bit or the higher bit of the two bits. For example, when the value of the lower bit of the two bits is "0", it means the combination of "2 data streams+1 data stream", and when the value of the lower bit of the two bits is "1", it means the combination of "1 data stream+2 data streams". Certainly, the disclosure does not limit the corresponding relationship between the values and the combinations. For example, it can also be that when the value of the lower bit of the two bits is "1", it means the combination of "2 data streams+1 data stream", and when the value of the lower bit of the two bits is "0", it means the combination of "1 data stream+2 data streams".

On the other hand, in the disclosure, when the number of supported data streams is at most 4, different values of two of the plurality of bits can be configured to indicate different data stream combinations. For example, in the disclosure, the combinations of "1 data stream+2 data streams", "2 data streams+1 data stream", "2 data streams+2 data streams", "1 data stream+3 data streams" and "3 data streams+1 data stream" can be indicated by different values of two bits. For example, when the values of two bits is "00", it means the combination of "1 data stream+3 data streams". When the values of the two bits is "01", it means the combination of "2 data streams+2 data streams". When the values of the two bits is "10", it means the combination of "3 data streams+1 data stream". Certainly, the disclosure does not limit the corresponding relationship between the values and the data stream combinations and other corresponding relationships may also be used. For example, when the values of the two bits is "11", it may mean the combination of "3 data streams+1 data stream".

For the convenience of description in the disclosure, the DCI including a plurality of bits may be referred to as a second DCI, the second DCI includes a second bit, and the number of bits included in the second bit may be 2. Different values of a bit in the second bit are configured to indicate different data stream combinations; or different values of all the bits in the second bit are configured to indicate different data stream combinations.

In the disclosure, one or more bits of the second bit are one or more bits with reserved values in the second DCI. The reserved bit values indicate the data stream combination, and the occupied bit value may indicate other information different from the data stream combination, for example, antenna port information.

In the disclosure, the network device transmits the indication signaling through the second DCI, so that the terminal after receiving the first DCI can determine the data stream combination based on the bit values and further determine the beam direction.

In some exemplary embodiments, the indication signaling is transmitted through the RRC signaling.

In some embodiments, in the disclosure, when TRP/panel configuration is performed by the RRC signaling, a plurality of data stream combinations supported by a plurality of TRPs/panels can be configured. At least one data stream combination is indicated through the RRC signaling. For example, in the disclosure, data stream combinations supported by two TRPs/panels are configured. For example, the supported data stream combinations are "1 data stream+1 data stream", "2 data streams+2 data streams", and "1 data stream+2 data streams".

Further, after the data stream combination that can be supported by the plurality of TRPs/panels in the disclosure is changed, the configured data stream combination is changed through the RRC reconfiguration signaling. For example, if the supported combination needs to be changed after a period of time, the RRC reconfiguration signaling is configured to change the combination. For example, the supported data stream combination is changed from {"1 data stream+1 data stream", "2 data streams+2 data streams" and "1 data stream+2 data streams"} to {"1 data stream+1 data stream", "2 data streams+2 data streams" and "2 data streams+1 data stream"}, or it is also possible to remove "1 data stream+2 data streams" and add "2 data streams+1 data stream" for RRC signaling configuration.

In the disclosure, the single RRC signaling may be configured to indicate the data stream combination. In the disclosure, the RRC signaling configured to indicate at least one data stream combination is referred to as the first RRC signaling. The network device transmits the indication signaling for indicating the data stream combination by transmitting the first RRC signaling. When the network device is scheduling resources, it transmits the DCI signaling to indicate the number of data streams and two beam directions. If the data stream is a downlink data stream, the terminal after receiving the first RRC signaling can determine the receiving beam of each data stream in the data stream combination to be received based on the first RRC signaling and the number of data streams and the 2 beam directions in the DCI scheduling signaling and uses the receiving beam to receive each data stream in the data stream combination. If the data stream is an uplink data stream, the terminal after receiving the first RRC signaling can determine the transmitting beam of each data stream in the data stream combination based on the first RRC signaling and the number of data streams and the two beam directions in the DCI scheduling signaling and uses the transmitting beam to transmit each data stream in the data stream combination.

In some exemplary embodiments, the indication signaling is transmitted through the RRC signaling and the MAC signaling.

In the disclosure, the RRC signaling may be configured to indicate N possible supported data stream combination sets, where N is a positive integer greater than or equal to 1. At least one data stream combination set from the N data stream combinations is activated through the MAC signaling.

In some embodiments, each data stream combination set in the N possible supported data stream combination sets indicated by the RRC signaling includes one data stream combination, that is, the RRC signaling indicates N supported data stream combinations. The MAC signaling includes N bits, each bit corresponds to one data stream combination, and at least one data stream combination is activated by setting at least one bit. For example, N is 6, which refers to the combinations of "1 data stream+1 data stream", "1 data stream+2 data streams", "2 data streams+1 data stream", "2 data streams+2 data streams", "1 data stream+3 data streams" and "3 data streams+1 data stream". The MAC signaling has 6 bits and each bit corresponds to one data stream combination. When the bit is set, the corresponding data stream combination is activated. For example, for a data stream combination, when the bit corresponding to the data stream combination is set to "1", it means that the data stream combination is activated, and the terminal can use the activated data stream combination to determine the beam direction. For example, the RRC signaling indicates all the data stream combinations in the above 6 data stream combinations. If N is 6, the MAC signaling includes 6 bits. The highest bit of the 6 bits is the leftmost bit corresponds to "1 data stream+1 data stream" . . . the lowest bit is the rightmost bit corresponds to "3 data streams+1 data stream". When the bits in the MAC signaling show 110100, it means three activated data stream combinations of "1 data stream+1 data stream", "1 data stream+2 data streams" and "2 data streams+2 data streams".

In some embodiments, the MAC signaling may include M bits, the M bits can at least indicate the value of N bits and each value corresponds to activating one data stream combination set, where M is a positive integer greater than or equal to 1. For example, the RRC signaling indicates all data stream combinations in the above 6 data stream combinations. If N is 6, M can be 3. Different values of 3 bits are configured to indicate different data stream combinations from the 6 data stream combinations. For example, "000" corresponds to "1 data stream+1 data stream" and "001" corresponds to "1 data stream+2 data streams". There is a one-to-one correspondence between the values and the data stream combinations. The one-to-one correspondence needs to be stored in the network device and the terminal. The data stream combination sets may be activated through the bit value. Each bit value correspondingly activates one data stream combination set.

In the disclosure, the method of activating the data stream combination sets indicated by the RRC signaling through the MAC signaling. If there are more than one data stream combination activated by the MAC signaling and the currently used data stream combination can be clearly indicated, there are restrictions on the data stream combinations activated by the MAC signaling simultaneously, that is, the MAC signaling may not activate ambiguous data stream combinations simultaneously. For example, the two combinations of "1 data stream+2 data streams" and "2 data streams+1 data stream" may not be activated simultaneously, and the three data stream combinations of "1 data stream+3 data streams", "3 data streams+1 data stream" and "2 data streams+2 data streams" may not be activated simultaneously, and at most one can be activated at the moment.

In the disclosure, if the RRC signaling gives a limited number of data stream combination sets and there is no ambiguous combination in the data stream combination set, the MAC signaling can activate one of them. There is no ambiguity combination means that the two combinations of "1 data stream+2 data streams" and "2 data streams+1 data stream" are not included in a combination set simultaneously. For another example, any two or more combinations of "1 data stream+3 data streams", "3 data streams+1 data stream" and "2 data streams+2 data streams" are not allowed to be included in a combination set simultaneously. Based on the RRC signaling, the combination sets are given as follows, i.e., combination set 1: {"1 data stream+1 data stream", "1 data stream+2 data streams" and "2 data streams+2 data streams"}; combination set 2: {"1 data stream+1 data stream", "2 data streams+1 data stream" and "2 data streams+2 data streams"}; combination set 3: {"1 data stream+1 data stream", "1 data stream+2 data streams" and "1 data stream+3 data streams"}; combination set 4: {"1 data stream+1 data stream", "2 data streams+1 data stream" and "1 data stream+3 data streams"}; combination set 5: {"1 data stream+1 data stream", "1 data stream+2 data streams" and "3 data streams+1 data stream"}; and combination set 6: {"1 data stream+1 data stream", "2 data streams+1 data stream" and "3 data streams+1 data stream"}. Then the MAC signaling can activate one data stream combination set in the data stream combination sets indicated by the RRC signaling.

In some embodiments, the indication signaling is transmitted through the RRC signaling, the MAC signaling and the DCI signaling.

In the disclosure, in the foregoing implementation of transmitting the indication signaling through the RRC signaling and the MAC signaling, if the data stream combination set activated by the MAC signaling includes a plurality of data stream combinations, the activated data stream combination may not be clearly determined. One of the data stream combinations in the data stream combination set activated by the MAC signaling can be indicated through the DCI signaling. For example, when there is the combination of "1 data stream+2 data streams" and the combination of "2 data streams+1 data stream" in the data stream combinations activated by the MAC signaling, or there are two or three combinations of "1 data stream+3 data streams", "3 data streams+1 data stream" and "2 data streams+2 data streams", the DCI signaling is required to indicate one data stream combination from the plurality of data stream combinations activated by the MAC signaling. For example, if the data stream combination set activated by the MAC signaling is {"1 data stream+2 data streams" and "2 data streams+1 data stream"}, it is necessary to indicate "1 data stream+2 data streams" and "2 data streams+1 data stream" by the DCI signaling. For another example, the data stream combination set activated by the MAC signaling is {"1 data stream+3 data streams", "3 data streams+1 data stream" and "2 data streams+2 data streams"}, it is necessary to indicate one data stream combination from "1 data stream+3 data streams", "3 data streams+1 data stream" and "2 data streams+2 data streams" through the DCI signaling.

In the disclosure, the DCI used to indicate one data stream combination in the data stream combination set activated by the MAC signaling may be referred to as the third DCI. The indication signaling is transmitted through the third DCI. The third DCI is configured to indicate the data stream combination in the data stream combination set activated by the MAC signaling. The terminal receiving the third DCI can clearly determine the data stream combination.

Figure 3:
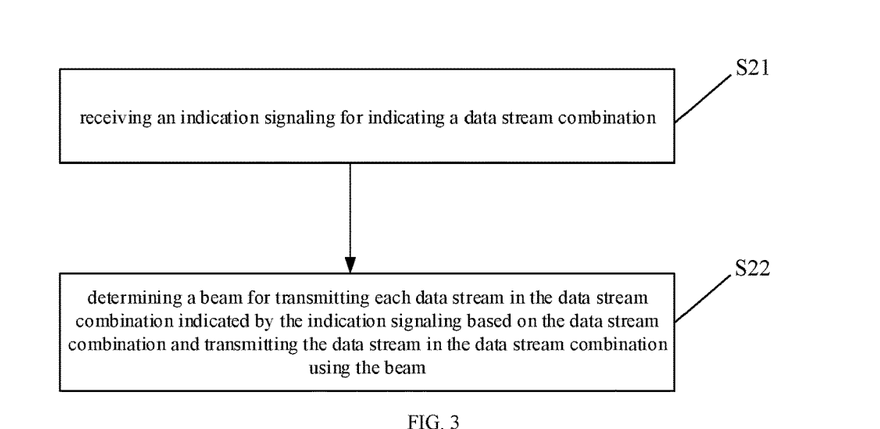
FIG. 3 is a flowchart of another method for transmitting data according to an exemplary embodiment.

FIG. 3 is a flowchart of a method for transmitting data according to an exemplary embodiment. As illustrated in FIG. 2, the method is applicable to a terminal. The method includes the following.

In S21, an indication signaling is received.

In the disclosure, the indication signaling is configured to indicate a data stream combination. The data stream combination includes a plurality of data streams. The plurality of data streams are grouped into at least two data stream groups. One or more data streams in each of the at least two data stream groups correspond to a beam direction.

In the disclosure, the indication signaling may be received through the first DCI or the second DCI. The indication signaling may also be received through the first RRC signaling, the second RRC signaling and the MAC signaling, or the second RRC signaling, the MAC signaling and the third DCI.

In S22, a beam for transmitting each data stream in the data stream combination indicated by the indication signaling is determined based on the data stream combination and the data stream in the data stream combination is transmitted using the beam.

In some embodiments, receiving the indication signaling includes: receiving the indication signaling through a first DCI. The first DCI includes a first bit and the first bit includes 1 bit. Different values of the first bit are configured to indicate different data stream combinations.

In some embodiments, the first bit includes a bit with a reserved value in the first DCI.

In some embodiments, receiving the indication signaling includes: receiving the indication signaling through a second DCI. The second DCI includes a second bit and the second bit includes 2 bits. Different values of a bit in the second bit are configured to indicate different data stream combinations; or different values of all the bits in the second bit are configured to indicate different data stream combinations.

In some embodiments, one or more bits of the second bit are one or more bits with reserved values in the second DCI.

In some embodiments, receiving the indication signaling includes: receiving the indication signaling through a first RRC signaling. The first RRC signaling is configured to indicate at least one data stream combination.

In some embodiments, receiving the indication signaling includes: receiving the indication signaling through a second RRC signaling and a MAC signaling. The second RRC signaling is configured to indicate N data stream combination sets. The MAC signaling is configured to activate at least one data stream combination set in the N data stream combination sets. N is a positive integer greater than or equal to 1.

In some embodiments, each data stream combination set in the N data stream combination sets includes a data stream combination, the MAC signaling includes N bits, each bit corresponds to a data stream combination, and at least one data stream combination is activated by setting at least one bit.

In some embodiments, the MAC signaling includes M bits, M bits are capable to indicate at least N bit values, and each bit value corresponds to activate a data stream combination set, where M is a positive integer greater than or equal to 1.

In some embodiments, receiving the indication signaling further includes: receiving the indication signaling through a third DCI. The third DCI is configured to indicate a data stream combination in a data stream combination set activated by the MAC signaling. For example, when there are combinations of "1 data stream+2 data streams" and "2 data streams+1 data stream" in the data stream combinations activated by the MAC signaling, or there are two or three combinations of "1 data stream+3 data streams", "3 data streams+1 data stream" and "2 data streams+2 data streams" existing simultaneously, it is necessary to indicate, through the third DCI, one of the multiple active data stream combinations activated by the MAC signaling.

After receiving the indication signaling in the disclosure, the terminal can determine the TCI state or spatial relation information through the data stream combination indicated by the indication signaling, then determine the receiving beam or the transmitting beam of each data stream in the data stream combination and use the receiving beam to receive each data stream in the data stream combination, or use the transmitting beam to transmit each data stream in the data stream combination.

It is understandable that the indication signaling received by the terminal in the disclosure is the same as the indication signaling transmitted by the network device. Therefore, for the parts described herein that are not detailed enough, reference should be made to the relevant descriptions in the above embodiments, which will not be repeated herein.

Figure 4:
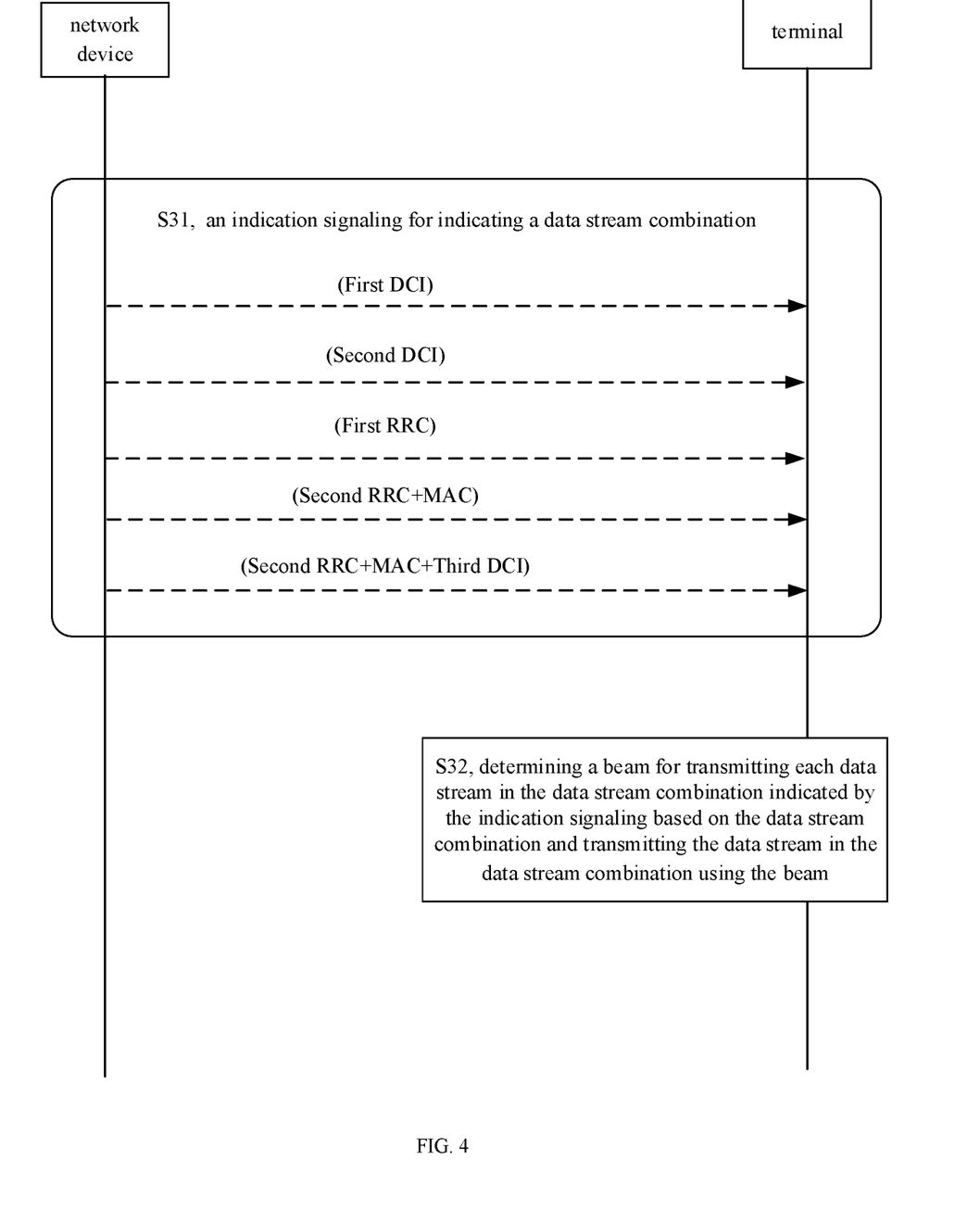
FIG. 4 is a flowchart of still another method for transmitting data according to an exemplary embodiment.

FIG. 4 is a flowchart of still another method for transmitting data according to an exemplary embodiment of the disclosure. In the method illustrated in FIG. 4, the network device and the terminal exchange data with each other for data transmission. As illustrated in FIG. 4, the method for transmitting data includes the following.

In S301, the network device determines and transmits an indication signaling for indicating a data stream combination.

The network device can transmit the indication signaling through the first DCI, the second DCI, the first RRC signaling, the second RRC signaling and the MAC signaling, or the second RRC signaling, the MAC signaling and the third DCI.

The terminal receives the indication signaling from the network device. The terminal receives the indication signaling in a manner corresponding to a manner of transmitting the indication signaling by the network device. For example, the terminal can receive the indication signaling through the first DCI, the second DCI, the first RRC signaling, the second RRC signaling and the MAC signaling, or the second RRC signaling, the MAC signaling and the third DCI.

In S302, the terminal determines a beam of each data stream in the data stream combination based on the data stream combination indicated by the received indication signaling and uses the determined beam to transmit each data stream in the data stream combination.

In the method for transmitting data according to the disclosure, the network device transmits the indication signaling for indicating the data stream combination, so that the terminal determines the data stream combination based on the indication signaling, determines the beam of each data stream in the data stream combination, and uses the determined beam to transmit each data stream in the data stream combination. The data stream can be transmitted or received accurately, the accuracy of transmitting or receiving the data stream can be improved, and the throughput can be improved.

Based on the same concept, embodiments of the disclosure also provide an apparatus for transmitting data.

It can be understood that, to realize the above functions, the apparatus for transmitting data provided in embodiments of the disclosure includes hardware structures and/or software modules corresponding to various functions. In combination with units and algorithm actions of examples disclosed in embodiments of the disclosure, embodiments of the disclosure can be implemented in a form of hardware or a combination of hardware and computer software. Whether a certain function is executed by hardware or computer software-driven hardware depends on specific applications and design constraint conditions of the technical solutions. Those skilled in the art can use different methods for each specific application to implement the described functions, but such implementation should not be considered as going beyond the scope of the technical solutions of embodiments of the disclosure.

Figure 5:
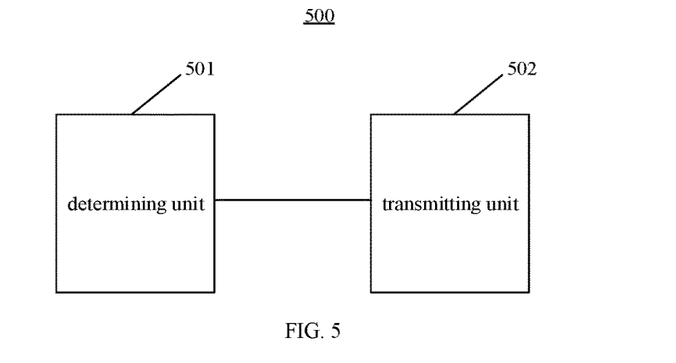
FIG. 5 is a block diagram of an apparatus for transmitting data according to an exemplary embodiment.

FIG. 5 is a block diagram of an apparatus 500 for transmitting data according to an exemplary embodiment. The apparatus 500 can be applicable to a network device. The apparatus 500 may be a base station or the like. The apparatus 500 includes: a determining unit 501 and a transmitting unit 502. The determining unit 501 is configured to determine an indication signaling for indicating a data stream combination. The data stream combination includes a plurality of data streams. The plurality of data streams is grouped into at least two data stream groups. One or more data streams in each of the at least two data stream groups correspond to a beam direction. The transmitting unit 502 is configured to transmit the indication signaling.

In some embodiments, the transmitting unit 502 is configured to transmit the indication signaling by: transmitting the indication signaling through a first DCI. The first DCI includes a first bit, and the first bit includes 1 bit. Different values of the first bit are configured to indicate different data stream combinations.

In some embodiments, the first bit includes a bit with a reserved value in the first DCI.

In some embodiments, the transmitting unit 502 is configured to transmit the indication signaling by: transmitting the indication signaling through a second DCI.

The second DCI includes a second bit and the second bit includes 2 bits. Different values of a bit in the second bit are configured to indicate different data stream combinations; or different values of all the bits in the second bit are configured to indicate different data stream combinations.

In some embodiments, one or more bits of the second bit are one or more bits with reserved values in the second DCI.

In some embodiments, the transmitting unit 502 is configured to transmit the indication signaling by: transmitting the indication signaling through a first RRC signaling. The first RRC signaling is configured to indicate at least one data stream combination.

In some embodiments, the transmitting unit 502 is configured to transmit the indication signaling by: transmitting the indication signaling through a second RRC signaling and a MAC signaling.

The second RRC signaling is configured to indicate N data stream combination sets, the MAC signaling is configured to activate at least one data stream combination set in the N data stream combination sets, and N is a positive integer greater than or equal to 1.

In some embodiments, each data stream combination set in the N data stream combination sets includes a data stream combination, the MAC signaling includes N bits, each bit corresponds to a data stream combination, and at least one data stream combination is activated by setting at least one bit.

In some embodiments, the MAC signaling includes M bits, M bits are capable to indicate at least N bit values, and each bit value corresponds to activate a data stream combination set, where M is a positive integer greater than or equal to 1.

In some embodiments, the transmitting unit 502 is configured to transmit the indication signaling by: transmitting the indication signaling through a third DCI. The third DCI is configured to indicate a data stream combination in a data stream combination set activated by the MAC signaling.

Regarding the apparatus in the above embodiments, the specific manner in which each module performs the operation has been described in detail in embodiments of the method and detailed description will not be given herein.

Figure 6:
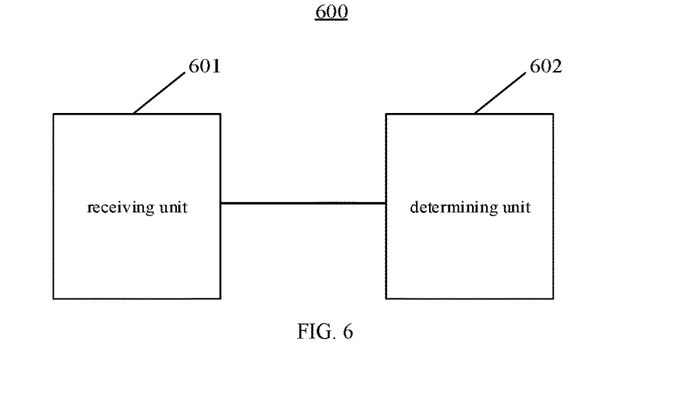
FIG. 6 is a block diagram of another apparatus for transmitting data according to an exemplary embodiment.

FIG. 6 is a block diagram of an apparatus 600 for transmitting data according to an exemplary embodiment. The apparatus 600 can be applicable to a terminal. The apparatus 600 may be a mobile phone, a computer, a digital broadcasting terminal, a message transceiver device, a game console, a tablet device, a medical device, a fitness device, a personal digital assistant and the like.

The apparatus 600 includes: a receiving unit 601 and a determining unit 602. The receiving unit 601 is configured to receive an indication signaling for indicating a data stream combination. The data stream combination includes a plurality of data streams. The plurality of data streams is grouped into at least two data stream groups. One or more data streams in each of the at least two data stream groups correspond to a beam direction. The determining unit 602 is configured to determine a beam for transmitting each data stream in the data stream combination indicated by the indication signaling based on the data stream combination and transmit the data stream in the data stream combination using the beam.

In some embodiments, the receiving unit 601 is configured to receive the indication signaling by: receiving the indication signaling through a first DCI. The first DCI includes a first bit and the first bit includes 1 bit. Different values of the first bit are configured to indicate different data stream combinations.

In some embodiments, the first bit includes a bit with a reserved value in the first DCI.

In some embodiments, the receiving unit 601 is configured to receive the indication signaling by: receiving the indication signaling through a second DCI. The second DCI includes a second bit and the second bit includes 2 bits. Different values of a bit in the second bit are configured to indicate different data stream combinations; or different values of all the bits in the second bit are configured to indicate different data stream combinations.

In some embodiments, one or more bits of the second bit are one or more bits with reserved values in the second DCI.

In some embodiments, the receiving unit 601 is configured to receive the indication signaling by: receiving the indication signaling through a first RRC signaling. The first RRC signaling is configured to indicate at least one data stream combination.

In some embodiments, the receiving unit 601 is configured to receive the indication signaling by: receiving the indication signaling through a second RRC signaling and a MAC signaling. The second RRC signaling is configured to indicate N data stream combination sets, the MAC signaling is configured to activate at least one data stream combination set in the N data stream combination sets, and N is a positive integer greater than or equal to 1.

In some embodiments, each data stream combination set in the N data stream combination sets includes a data stream combination, the MAC signaling includes N bits, each bit corresponds to a data stream combination, and at least one data stream combination is activated by setting at least one bit.

In some embodiments, the MAC signaling includes M bits, M bits are capable to indicate at least N bit values, and each bit value corresponds to activate a data stream combination set, where M is a positive integer greater than or equal to 1.

In some embodiments, the receiving unit 601 is configured to receive the indication signaling by: receiving the indication signaling through a third DCI. The third DCI is configured to indicate a data stream combination in a data stream combination set activated by the MAC signaling.

Regarding the apparatus in the above embodiments, the specific manner in which each module performs the operation has been described in detail in embodiments of the method and detailed description will not be given herein.

Embodiments of the disclosure also provide a communication system, which includes the above apparatus 500 for transmitting data for the network device and the apparatus 600 for transmitting data for the terminal. The functions of the apparatus 500 and the apparatus 600 can be referred to detailed description of the above embodiments.

Figure 7:
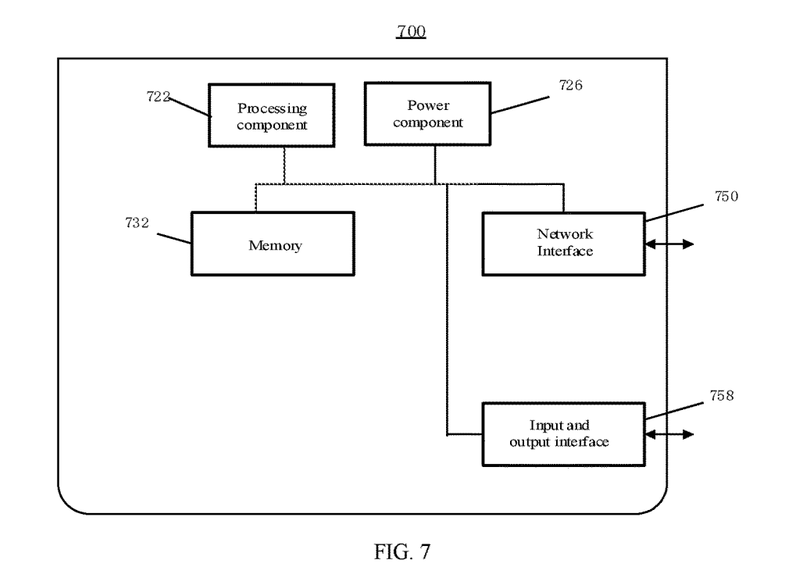
FIG. 7 is a block diagram of a device for transmitting data according to an exemplary embodiment.

FIG. 7 is a block diagram of a device 700 for transmitting data according to some embodiments of the disclosure. For example, the device 700 may be provided as a network device. For example, the device 700 may be provided as a network device, such as a base station. As illustrated in FIG. 7, the device 700 includes a processing component 722. The processing component 722 includes one or more processors. The device 700 further includes a memory resource represented by a memory 732, for storing instructions that can be executed by the processing component 722, such as application programs. The application programs stored in the memory 732 may include one or more modules each corresponding to a set of instructions. In addition, the processing component 722 is configured to execute instructions to execute the above methods.

The device 700 may also include a power component 726 configured to perform power management of the device 700, a wired or wireless network interface 750 configured to connect the device 700 to a network, and an input/output (I/O) interface 758. The device 700 can operate based on an operating system stored in the memory 732, such as Windows Server™, Mac OS X™, Unix™, Linux™, FreeBSD™ or the like.

In exemplary embodiments, there is also provided a non-transitory computer readable storage medium including instructions, such as the memory 732 including the instructions. The instructions can be executable by the processor 722 in the device 700, for performing the above methods. For example, the non-transitory computer-readable storage medium may be a read only memory (ROM), a random access memory (RAM), a compact disc read only memory (CD-ROM), a magnetic tape, a floppy disc, an optical data storage device, and the like.

Figure 8:
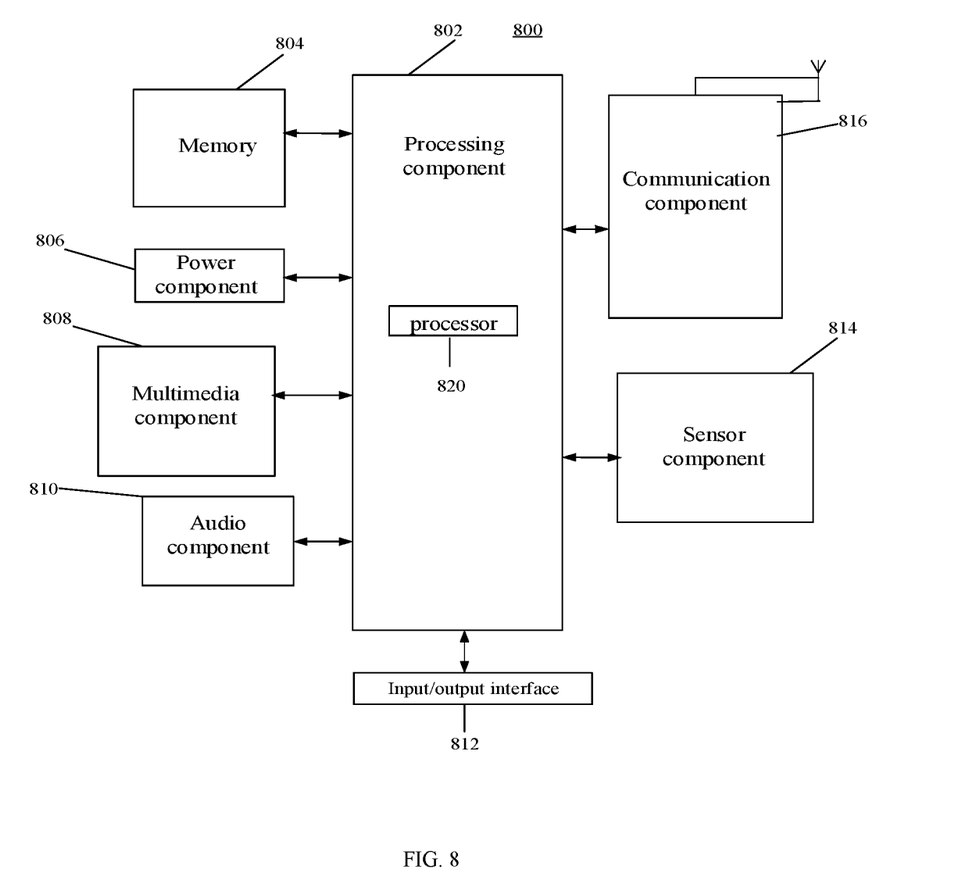
FIG. 8 is a block diagram of another device for transmitting data according to an exemplary embodiment.

FIG. 8 is a block diagram of a device 800 for transmitting data according to some embodiments of the disclosure. The device 800 can be applicable to a terminal. The device 800 may be a mobile phone, a computer, a digital broadcasting terminal, a message transceiver device, a game console, a tablet device, a medical device, a fitness device and a personal digital assistant.

As illustrated in FIG. 8, the device 800 may include one or more of the following components: a processing component 802, a memory 804, a power component 806, a multimedia component 808, an audio component 810, an input/output (I/O) interface 812, a sensor component 814, and a communication component 816.

The processing component 802 generally controls overall operations of the device 800, such as the operations associated with display, telephone calls, data communications, camera operations, and recording operations. The processing component 802 may include one or more processors 820 to execute instructions to perform all or part of the steps in the above described method. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the device 800. Examples of such data include instructions for any applications or methods operated on the device 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 800. The power component 806 may include a power management system, one or more power sources, and any other components associated with the generation, management, and distribution of power in the device 800.

The multimedia component 808 includes a screen providing an output interface between the device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front-facing camera and/or a rear-facing camera. When the device 800 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 810 is configured to output and/or input audio signals. For example, the audio component 810 includes a microphone (MIC) configured to receive an external audio signal when the device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the device 800. For instance, the sensor component 814 may detect an open/closed status of the device 800, relative positioning of components, e.g., the display and the keypad, of the device 800, a change in position of the device 800 or a component of the device 800, a presence or absence of user contact with the device 800, an orientation or an acceleration/deceleration of the device 800, and a change in temperature of the device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the device 800 and other devices. The device 800 can access a wireless network based on a communication standard, such as Wi-Fi, 2G, or 3G, or a combination thereof In an exemplary embodiment, the communication component 816 receives a broadcast signal or broadcast associated information from an external broadcast management system via a broadcast channel. In an exemplary embodiment, the communication component 816 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In exemplary embodiments, the device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In exemplary embodiments, there is also provided a non-transitory computer readable storage medium including instructions, such as the memory 804 including the instructions. The instructions can be executable by the processor 820 in the device 800, for performing the above methods. For example, the non-transitory computer-readable storage medium may be a ROM, a RAM, a CD-ROM, a magnetic tape, a floppy disc, an optical data storage device, and the like.

It should be understood that "several" mentioned in the disclosure refers to one or more, and "a plurality of" refers to two or more. The term "and/or" describes an association relationship among the associated objects, indicating that there are three types of relationships, for example, A and/or B, i.e., A alone exists, A and B exist at the same time, and B exists alone. The character "/" generally indicates that the associated objects before and after are in an "or" relationship. The singular forms "a", "said" and "the" are also intended to include plural forms, unless the context clearly indicates other meanings.

It can be further understood that the terms "first" and "second" are used to describe various information, but the information should not be limited to these terms. These terms are only used to distinguish the same type of information from each other, and do not indicate a specific order or degree of importance. In fact, expressions such as "first" and "second" can be used interchangeably. For example, without departing from the scope of the disclosure, the first information may also be referred to as second information, and similarly, the second information may also be referred to as the first information.

It is understood that, although the operations are described in a specific order in the drawings in the embodiments of the disclosure, the operations do not need to be performed in the specific order illustrated or in a serial order, or are required to be performed to get a desired result. In certain circumstances, multitasking and parallel processing may be advantageous.

The technical solutions provided in the embodiments of the disclosure may include the following beneficial effects. Through the indication signaling for indicating the data stream combination, the terminal determines the beam for transmitting each data stream in the transmission data stream combination based on the data stream combination indicated by the indication signaling and uses the determined beam to transmit each data stream in the data stream combination, so that the data stream is accurately received or transmitted and the throughput is improved.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for transmitting data, performed by a network device, comprising:
    determining an indication signaling for indicating a data stream combination, the data stream combination comprising a plurality of data streams, the plurality of data streams being grouped into at least two data stream groups, one or more data streams in each of the at least two data stream groups being corresponding to a beam direction, wherein different data stream groups of the at least two data stream groups each corresponds to a different beam direction, and different beam directions are indicated by transmission configuration indication (TCI) states, or spatial relation information; and
    transmitting the indication signaling;
    wherein transmitting the indication signaling comprises:
    transmitting the indication signaling through a second radio resource control (RRC) signaling and a medium access control (MAC) signaling,
    wherein the second RRC signaling is configured to indicate N data stream combination sets, the MAC signaling is configured to activate at least one data stream combination set in the N data stream combination sets, and N is a positive integer greater than or equal to 1;
    wherein the MAC signaling comprises M bits, M bits are capable to indicate at least N bit values, and each bit value corresponds to activate a data stream combination set, where M is a positive integer greater than or equal to 1.

2. The method as claimed in claim 1, wherein transmitting the indication signaling further comprises:
    transmitting the indication signaling through a third downlink control information (DCI),
    wherein the third DCI is configured to indicate a data stream combination in a data stream combination set activated by the MAC signaling.

3. A non-transitory computer-readable storage medium having instructions stored thereon, wherein when the instructions in the storage medium are executed by a processor of a network device, the network device is caused to execute the method for transmitting data according to claim 1.

4. A method for transmitting data, performed by a terminal, comprising:
    receiving an indication signaling for indicating a data stream combination, the data stream combination comprising a plurality of data streams, the plurality of data streams being grouped into at least two data stream groups, and one or more data streams in each of the at least two data stream groups being corresponding to a beam direction, wherein different data stream groups of the at least two data stream groups each corresponds to a different beam direction, and different beam directions are indicated by transmission configuration indication (TCI) states, or spatial relation information; and
    determining a beam for transmitting each data stream in the data stream combination indicated by the indication signaling based on the data stream combination and transmitting the data stream in the data stream combination using the beam;
    wherein receiving the indication signaling comprises:
    receiving the indication signaling through a second radio resource control (RRC) signaling and a medium access control (MAC) signaling, wherein the second RRC signaling is configured to indicate N data stream combination sets, the MAC signaling is configured to activate at least one data stream combination set in the N data stream combination sets, and N is a positive integer greater than or equal to 1;

wherein the MAC signaling comprises M bits, M bits are capable to indicate at least N bit values, and each bit value corresponds to activate a data stream combination set, where M is a positive integer greater than or equal to 1.

5. The method as claimed in claim 4, wherein receiving the indication signaling further comprises:

receiving the indication signaling through a third downlink control information (DCI), wherein the third DCI is configured to indicate a data stream combination in a data stream combination set activated by the MAC signaling.

6. A device for transmitting data, comprising:

a processor;

a memory configured to store instructions executable by the processor; wherein, the processor is configured to execute the method for transmitting data according to claim 4.

7. A non-transitory computer-readable storage medium having instructions stored thereon, wherein when the instructions in the storage medium are executed by a processor of a terminal, the terminal is caused to execute the method for transmitting data according to claim 4.

8. A device for transmitting data, comprising:

a processor;

a memory configured to store instructions executable by the processor;

wherein, the processor is configured to:

determine an indication signaling for indicating a data stream combination, the data stream combination comprising a plurality of data streams, the plurality of data streams being grouped into at least two data stream groups, one or more data streams in each of the at least two data stream groups being corresponding to a beam direction, wherein different data stream groups of the at least two data stream groups each corresponds to a different beam direction, and different beam directions are indicated by transmission configuration indication (TCI) states, or spatial relation information; and transmit the indication signaling;

wherein transmitting the indication signaling comprises:

transmitting the indication signaling through a second radio resource control (RRC) signaling and a medium access control (MAC) signaling, wherein the second RRC signaling is configured to indicate N data stream combination sets, the MAC signaling is configured to activate at least one data stream combination set in the N data stream combination sets, and N is a positive integer greater than or equal to 1;

wherein the MAC signaling comprises M bits, M bits are capable to indicate at least N bit values, and each bit value corresponds to activate a data stream combination set, where M is a positive integer greater than or equal to 1.

* * * * *